US010096432B2

United States Patent
Mitchell et al.

(10) Patent No.: US 10,096,432 B2
(45) Date of Patent: Oct. 9, 2018

(54) ELECTRODE GRAPHITE FILM AND ELECTRODE DIVIDER RING FOR AN ENERGY STORAGE DEVICE

(71) Applicant: MAXWELL TECHNOLOGIES, INC., San Diego, CA (US)

(72) Inventors: Porter Mitchell, Chandler, AZ (US); Thomas J. Dougherty, Waukesha, WI (US)

(73) Assignee: Maxwell Technologies, Inc., San Diego, CA (US)

( * ) Notice: Subject to any disclaimer, the term of this patent is extended or adjusted under 35 U.S.C. 154(b) by 535 days.

(21) Appl. No.: 14/208,288

(22) Filed: Mar. 13, 2014

(65) Prior Publication Data
US 2014/0272538 A1    Sep. 18, 2014

Related U.S. Application Data

(60) Provisional application No. 61/785,952, filed on Mar. 14, 2013.

(51) Int. Cl.
*H01G 11/36* (2013.01)
*H01M 12/00* (2006.01)
(Continued)

(52) U.S. Cl.
CPC ............ *H01G 11/36* (2013.01); *H01G 11/12* (2013.01); *H01G 11/28* (2013.01); *H01G 11/68* (2013.01);
(Continued)

(58) Field of Classification Search
CPC ..................................... H01M 4/36
See application file for complete search history.

(56) References Cited

U.S. PATENT DOCUMENTS 3,648,126 A * 3/1972 Boos ............ H01G 9/155
361/502
3,652,902 A * 3/1972 Hart ............. H01G 9/155
361/502
(Continued)

FOREIGN PATENT DOCUMENTS

JP    S55-016694    2/1980
JP    S62-130505    6/1987
(Continued)

OTHER PUBLICATIONS

A. Ghosh, et al. "Carbon Based Electrochemical Capacitors," ChemSusChem vol. 5, Issue 3, pp. 480-499, 2012.
(Continued)

*Primary Examiner* — Ula C Ruddock
*Assistant Examiner* — Amanda Barrow
(74) *Attorney, Agent, or Firm* — Knobbe Martens Olson & Bear LLP

(57) ABSTRACT

An energy storage device can have a first graphite film, a second graphite film and an electrode divider ring between the first graphite film and the second graphite film, forming a sealed enclosure. The energy storage device may be compatible with an aqueous electrolyte or a non-aqueous electrolyte. A method of forming an energy storage device can include providing an electrode divider ring, a first graphite film and a second graphite film. The method can include pressing a first edge of the electrode divider ring into a surface of the first graphite film, and pressing a second opposing edge of the electrode divider ring into a surface of the second graphite film to form a sealed enclosure. The sealed enclosure may have as opposing surfaces the surface of the first graphite film and the surface of the second graphite film.

16 Claims, 9 Drawing Sheets

(51) Int. Cl.

| | | |
|---|---|---|
| *H01M 10/0585* | (2010.01) | |
| *H01M 4/133* | (2010.01) | |
| *H01M 4/66* | (2006.01) | |
| *H01G 11/86* | (2013.01) | |
| *H01M 4/04* | (2006.01) | |
| *H01G 11/12* | (2013.01) | |
| *H01G 11/28* | (2013.01) | |
| *H01G 11/68* | (2013.01) | |
| *H01G 11/80* | (2013.01) | |

(52) U.S. Cl.
CPC ............. *H01G 11/80* (2013.01); *H01G 11/86* (2013.01); *H01M 4/043* (2013.01); *H01M 4/0404* (2013.01); *H01M 4/133* (2013.01); *H01M 4/663* (2013.01); *H01M 10/0585* (2013.01); *H01M 12/005* (2013.01); *Y02E 60/13* (2013.01); *Y10T 29/4911* (2015.01); *Y10T 29/49108* (2015.01); *Y10T 29/49115* (2015.01)

(56) References Cited

U.S. PATENT DOCUMENTS

| | | | | |
|---|---|---|---|---|
| 4,023,079 | A * | 5/1977 | Selover, Jr. | H01G 9/155 156/306.9 |
| 4,488,203 | A * | 12/1984 | Muranaka | H01G 9/08 361/434 |
| 5,072,335 | A * | 12/1991 | Kurabayashi | H01G 9/155 29/25.03 |
| 5,419,977 | A * | 5/1995 | Weiss | H01M 10/4264 429/303 |
| 5,441,824 | A * | 8/1995 | Rippel | H01M 10/0413 429/152 |
| 5,786,981 | A * | 7/1998 | Aoki | H01G 9/155 361/502 |
| 6,097,587 | A * | 8/2000 | Inagawa | H01G 9/155 361/502 |
| 6,377,441 | B1 * | 4/2002 | Ohya | H01G 9/155 361/502 |
| 6,567,561 | B2 | 5/2003 | Yamaguchi et al. | |
| 6,751,084 | B2 * | 6/2004 | Nakazawa | H01G 9/155 361/502 |
| 7,232,601 | B2 | 6/2007 | Mercuri et al. | |
| 2002/0051335 | A1 | 5/2002 | Ohya et al. | |
| 2003/0147201 | A1 * | 8/2003 | Nakazawa | H01G 9/155 361/502 |
| 2003/0152831 | A1 * | 8/2003 | Davidson | H01M 2/0413 429/174 |
| 2004/0233613 | A1 * | 11/2004 | Kasahara | H01G 9/155 361/502 |
| 2007/0014076 | A1 * | 1/2007 | Omura | H01G 9/10 361/502 |
| 2012/0064388 | A1 * | 3/2012 | Whitacre | H01M 10/0585 429/160 |
| 2013/0215554 | A1 * | 8/2013 | Son | H01G 11/78 361/502 |

FOREIGN PATENT DOCUMENTS

| | | |
|---|---|---|
| JP | H05-074657 | 3/1993 |
| JP | H05-159974 | 6/1993 |
| JP | H06-342739 | 12/1994 |
| JP | 2000-058387 | 2/2000 |
| JP | 2002-075788 | 3/2002 |
| JP | 2002/280059 | 9/2002 |
| WO | WO 2012/122353 | 9/2012 |
| WO | WO 2012/149467 | 11/2012 |

OTHER PUBLICATIONS

GrafTech International Holdings, Inc. "GRAFOIL® GTC Flexible Graphite Sheet Technical Data Sheet 002," 2001, 2 pages.

* cited by examiner

ELECTRODE GRAPHITE FILM AND ELECTRODE DIVIDER RING FOR AN ENERGY STORAGE DEVICE

CROSS REFERENCE TO RELATED APPLICATIONS

This application claims the benefit of U.S. Provisional Patent Application Ser. No. 61/785,952, filed Mar. 14, 2013, entitled "ELECTRODE GRAPHITE FILM AND ELECTRODE DIVIDER RING FOR AN ENERGY STORAGE DEVICE," which is hereby incorporated herein by reference in its entirety.

BACKGROUND

Field

The present invention relates generally to electric energy storage devices, and more specifically, to an energy storage device which can provide a sealed compartment for enclosing one or more of the energy storage device components.

Description of the Related Art

An energy storage device, such as an ultracapacitor, a battery, and/or a battery-capacitor hybrid, can include a plurality of individual energy storage cells, such as individual ultracapacitor cells, battery cells, and/or battery-capacitor hybrid cells, enclosed in a common external housing. The plurality of individual energy storage cells may be arranged in a stacked configuration, in parallel or in series. There can be challenges related to manufacturability, reliability and performance of an energy storage device arranged with a plurality of individual energy storage cells. Thus, there is a need for energy storage devices with improved manufacturability, reliability and performance.

SUMMARY

An energy storage device can include a first graphite film, a second graphite film, and an electrode divider ring disposed between the first graphite film and the second graphite film, where the first graphite film, the second graphite film, and the electrode divider ring can form a sealed enclosure. The energy storage device may include an ultracapacitor. In some embodiments, the energy storage device may include a battery. The energy storage device may include a double-layer capacitor, a hybrid capacitor and/or a pseudocapacitor.

In some embodiments, at least a portion of a first edge of the electrode divider ring extends into the first graphite film and at least a portion of a second opposing edge of the electrode divider ring extends into the second graphite film. In some embodiments, at least one of the first edge and the second opposing edge has at least one of a protrusion and a depression. The at least one protrusion and depression may extend along an entire length of an electrode divider ring edge.

In some embodiments, the energy storage device can include a first electrode film on a surface of the first graphite film facing the electrode divider ring, and a second electrode film on a surface of the second graphite film facing the electrode divider ring. In some embodiments, the energy storage device can include a separator between the first electrode film and the second electrode film.

In some embodiments, the energy storage device can include an aqueous electrolyte. The energy storage device may include a non-aqueous electrolyte.

In some embodiments, at least one of the first electrode film and the second electrode film can include at least one of an activated carbon material, a graphene material, and an oxide material.

An energy storage system can include a plurality of individual energy storage devices positioned one over the next in a stacked configuration, where at least one of the plurality of individual energy storage devices includes a first graphite film, a second graphite film, and an electrode divider ring disposed between the first graphite film and the second graphite film, where the first graphite film, the second graphite film, and the electrode divider ring can form a sealed enclosure.

In some embodiments, the second graphite film of the at least one of the plurality of individual energy storage devices is adjacent a first graphite film of an adjacent individual energy storage device, where the adjacent first graphite film and second graphite film are electrically coupled to couple the adjacent individual energy storage devices in electrical series. The adjacent first graphite film and second graphite film may be in direct contact with one another.

In some embodiments, the energy storage system can include a first electrically conductive component coupled to a top of the stack of plurality of individual energy storage devices at a first graphite film of a first individual energy storage device, and a second electrically conductive component coupled to the bottom of the stack of plurality of individual energy storage devices at a second graphite film of a last individual energy storage device.

The at least one of the plurality of individual energy storage devices can include an ultracapacitor. The at least one of the plurality of individual energy storage devices can include a battery. The at least one of the plurality of individual energy storage devices can include a double-layer capacitor, a hybrid capacitor and/or a pseudocapacitor.

A method of fabricating an energy storage device can include providing an electrode divider ring, a first graphite film and a second graphite film, pressing a first edge of the electrode divider ring into a surface of the first graphite film, and pressing a second opposing edge of the electrode divider ring into a surface of the second graphite film to form a sealed enclosure, the sealed enclosure having as opposing surfaces the surface of the first graphite film and the surface of the second graphite film. The energy storage device can include an ultracapacitor. In some embodiments, the energy storage device can include a battery. The energy storage device may include a double-layer capacitor, a hybrid capacitor and/or a pseudocapacitor.

In some embodiments, the method can include attaching a first electrode film onto the surface of the first graphite film and attaching a second electrode film onto the surface of the second graphite film.

In some embodiments, the method can include impregnating the first electrode film and the second electrode film prior to pressing the second opposing edge of the electrode divider ring into the surface of the second graphite film to form the sealed enclosure.

In some embodiments, the method can include placing a separator over the first electrode film within the electrode divider ring. In some embodiments, the method can include impregnating the separator with an electrolyte prior to placing the separator over the first electrode film.

For purposes of summarizing the invention and the advantages achieved over the prior art, certain objects and advantages are described herein. Of course, it is to be understood that not necessarily all such objects or advantages need to be achieved in accordance with any particular embodiment.

Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

DETAILED DESCRIPTION

Figure 1A:
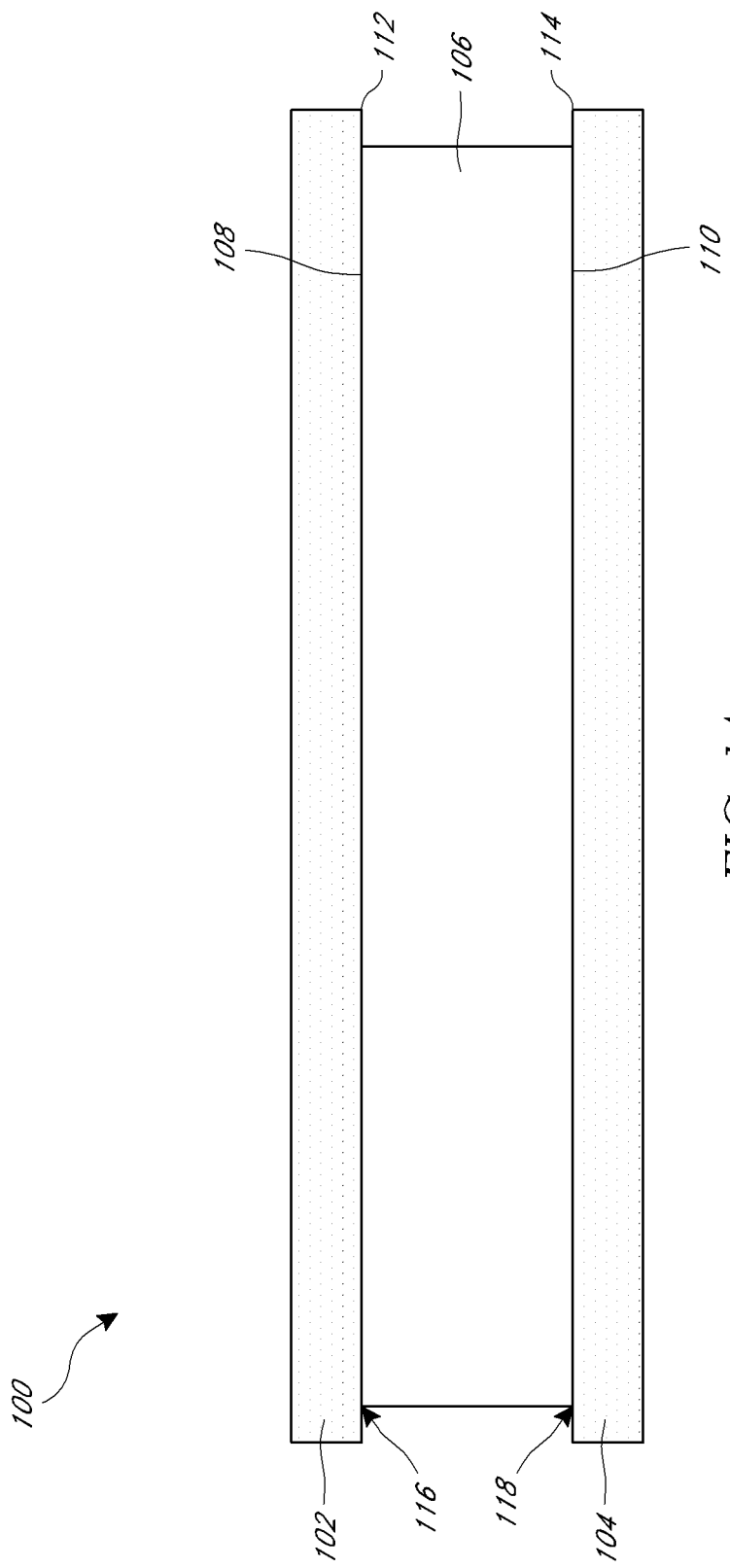
FIG. 1A shows an exterior side plan view of an example energy storage cell according to one embodiment.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Challenges can be encountered in the fabrication of an energy storage device having a plurality of individual energy storage cells enclosed in the same external housing. For example, electrolyte material can leak between the individual cells, causing electrical shorting and degradation of device performance or failure. For this reason, it can be difficult to provide reliable and repeatable sealing between the individual energy storage cells to prevent such electrical shorting.

Additionally, one or more components of the individual energy storage device cells may not be compatible with the cell's electrolyte, resulting in degradation of one or more components during operation of the energy storage device. For example, a conductive plate, such as a current collector, of an energy storage cell may be chemically and/or mechanically unstable during operation of the cell. For example, the conductive plate may, during operation of the cell, chemically degrade due at least partially to chemical interaction with the electrolyte, including for example an electrolyte solvent, and/or structurally deform, such as due to cell swelling. Chemical and/or mechanical instability of the cell during operation may negatively impact electrical performance, such as reducing an operating voltage of the cell.

Embodiments relate to an energy storage device having components and/or configurations which facilitate stable operation of the energy storage device. One embodiment is an energy storage device which includes a plurality of individual ultracapacitor cells in a stacked configuration, for example a plurality of bipolar ultracapacitor cells exhibiting increased voltage performance. Each individual ultracapacitor cell can include a conductive plate comprising, or consisting essentially of, a graphite film. The conductive plates described herein need not be rigid, and can, for example, comprise a flexible material, such as a foil. The conductive plate can be a current collector which facilitates electrical connection between the cell and a circuit external to the cell. An ultracapacitor cell can include two conductive plates, each made of a graphite film, and an electrode divider ring between the graphite films as discussed in more detail below.

Each of the two graphite films can be coupled to an edge on opposing portions of the electrode divider ring such that the two graphite films and the electrode divider ring form a sealed enclosure within which other components of the ultracapacitor cell can be placed. The graphite film can be imperforated or substantially imperforated. This allows insubstantial to virtually no leakage of electrolyte through its thickness. In addition, placing a seal between the graphite films and the electrode divider ring can provide a sealed ultracapacitor cell.

Such embodiments can substantially prevent or eliminate electrolyte leakage, and thus, electrical shorting, between the individual ultracapacitor cells. Such embodiments can provide ultracapacitor cells demonstrating improved structural integrity during operation of the cells. In some embodiments, each of a first graphite film and a last graphite film in the stack of ultracapacitor cells can be coupled to an electrically conductive component, such as an aluminum film, to facilitate connection between the energy storage device and an external circuit. It will be understood that any reference herein to "capacitor," "ultracapacitor," or their components, such as "ultracapacitor cells," are for illustrative purposes only, and can readily be applied or substituted within the context of other energy storage devices, including but not limited to batteries or hybrid battery-capacitor devices.

An ultracapacitor cell, such as a bipolar ultracapacitor cell can typically include a first electrode, a second electrode and a separator between the first electrode and the second electrode. One or more of the electrodes can be coupled to a current collector to facilitate electrical contact with an external circuit. The electrodes and the separator may be immersed in an electrolyte which provides a transport of ionic species between the two electrodes. The separator can prevent electrical contact between the two electrodes while permitting transport of ionic species between the electrodes.

In one embodiment of the invention, an energy storage cell, such as an ultracapacitor cell, can include a current collector component made from a graphite film. FIG. 1A shows an exterior side plan view of an example ultracapacitor cell 100 according to one embodiment. Although described herein as an ultracapacitor cell 100, it will be understood that the ultracapacitor cell 100 can be employed within a container to protect the ultracapacitor cell 100 and form a single-cell capacitor, or with a plurality of cells in a container, to form a multi-cell capacitor. The ultracapacitor cell 100 can include a first film 102, a second film 104 and an electrode divider ring 106 between the first film 102 and the second film 104. The films 102, 104 can be electrically conductive, for example serving as current collector components to facilitate electrical contact between the ultracapacitor cell 100 and an external circuit. The films 102, 104 can comprise or consistent essentially of graphite, due to the electrical conductance and physical properties of graphite related to its ability to seal with divider ring 106, as described further below. It will be understood that films 102, 104 can comprise or consist essentially of other materials with similar physical and electrical characteristics as graphite.

A surface 112 of the first graphite film 102 can be coupled to a first edge 108 of the electrode divider ring 106. The surface 112 can face an interior of the ultracapacitor cell 100, or downwardly, as shown in the orientation of FIG. 1A. A surface 114 of the second graphite film 104 can be coupled to a second opposing edge 110 of the electrode divider ring 106. The second opposing edge 110 can be on a portion of the electrode divider ring 106 opposite the edge 108 coupled to the first graphite film 102. The surface 114 of the second graphite film 104 can face an interior of the ultracapacitor cell 100, or upwardly, as shown in the orientation of FIG. 1A.

The first edge 108 of the electrode divider ring 106 can contact surface 112, to form a seal therebetween. For example, the first edge 108 of the electrode divider ring 106 can be pressed into the first graphite film 102, for example, such that the edge 108 extends into the surface 112 of the first graphite film 102, forming a sealed interface 116 between the first graphite film 102 and the electrode divider ring 106. The second opposing edge 110 of the electrode divider ring 106 can similarly contact surface 114, to form a seal therebetween. For example, the second edge 110 of the divider ring 106 can be pressed into the second graphite film 104, for example, such that edge 110 extends into the surface 114 of the second graphite film 104, forming a sealed interface 118 between the second graphite film 104 and the electrode divider ring 106.

Figure 1B:
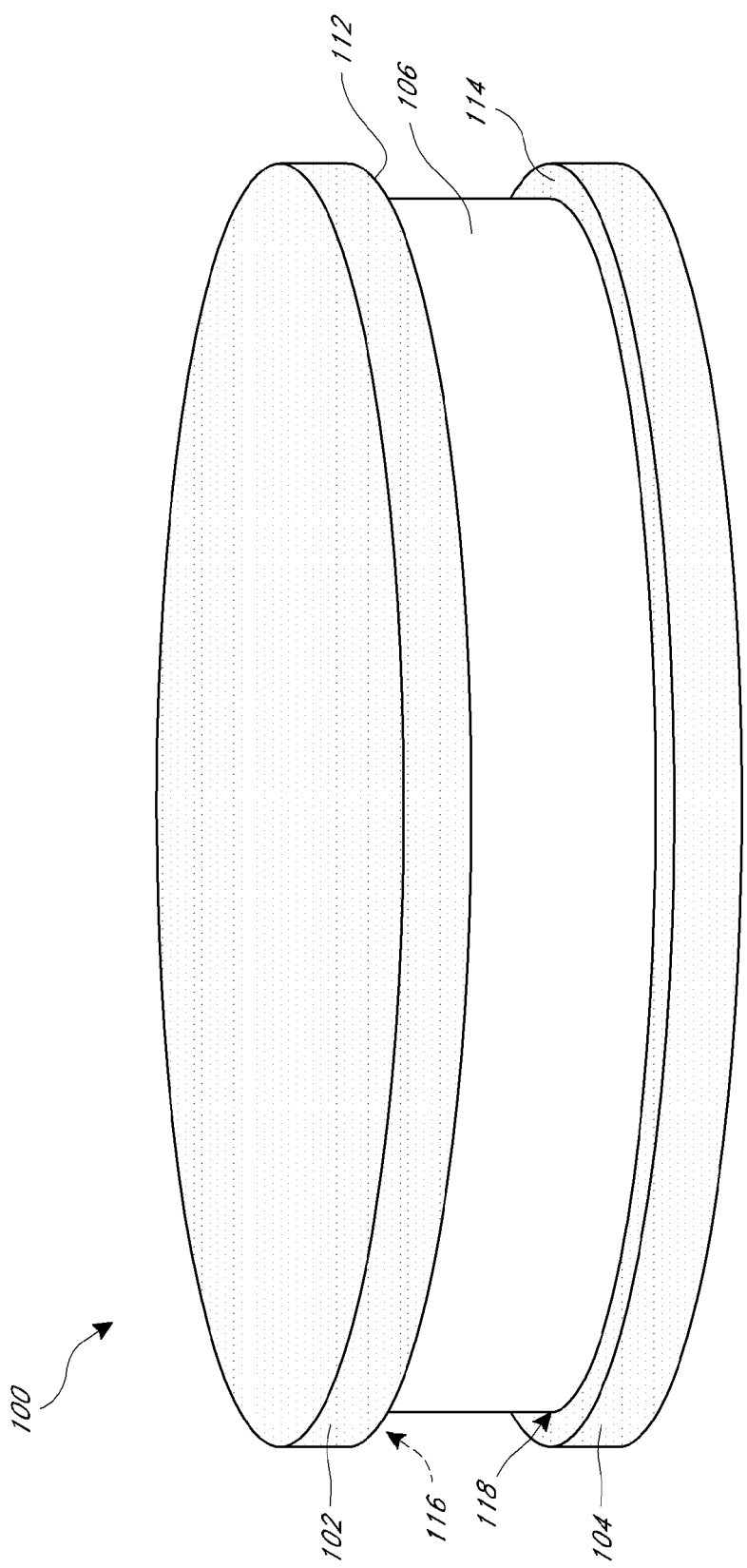
FIG. 1B shows a perspective view of the example energy storage cell of FIG. 1A.

FIG. 1B is a perspective view of the ultracapacitor cell 100 of FIG. 1A. According to the embodiment shown in FIG. 1B, the electrode divider ring 106, the first graphite film 102 and the second graphite film 104, can have one or more curved edges. For example the electrode divider ring 106, the first graphite film 102 and the second graphite film 104 are shown with a circular or substantially circular shape. The electrode divider ring 106 can be centrally or substantially centrally positioned with respect to the first graphite film 102 and the second graphite film 104, as shown, or substantially offset with respect to films 102, 104. In some embodiments, the first graphite film 102 and the second graphite film 104 can have a size larger than the electrode divider ring 106 such that the electrode divider ring 106 can be sufficiently securely seated in the first graphite film 102 and the second graphite film 104 to form a sealed enclosure, as described above. For example, the first graphite film 102 and/or the second graphite film 104 can have a diameter larger than a diameter of the electrode divider ring 106 such that the electrode divider ring 106 to facilitate the aforementioned secure coupling and sealing between the divider ring 106 and the first graphite film 102 and the second graphite film 104. Similarly, the film 102 and/or film 104 can have a larger width or perimeter than the divider ring 106. Such relative sizing between these components can be configured to facilitate fabrication of an ultracapacitor cell by using sufficient graphite film material to facilitate secure coupling between an electrode divider ring and the graphite film, such as to provide an ultracapacitor cell with improved reliability, while facilitating fabrication of an ultracapacitor cell 100 of increased energy density.

It will be understood that the circular or substantially circular cross-sectional shape of the components in FIG. 1B is for illustrative purposes only. In some embodiments, such as the ultracapacitor cell 100 shown in FIG. 1A, an electrode divider ring, a first graphite film and/or a second graphite film, can have one or more linear or substantially linear edges, to form, for example, a polygon shaped cross-section. For example, an electrode divider ring, a first graphite film and/or a second graphite film, can have a triangular or a substantially triangular shaped cross-section, and/or a rectangular or a substantially rectangular shaped cross-section, and/or other regular or irregular linear or curved shapes, or combinations thereof. These components can also have the same or different shapes with respect to each other, as described further herein. For example, the electrode divider ring 106 may or may not have a shape similar to or substantially similar to that of the first graphite film 102 and/or the second graphite film 104.

Figure 2:
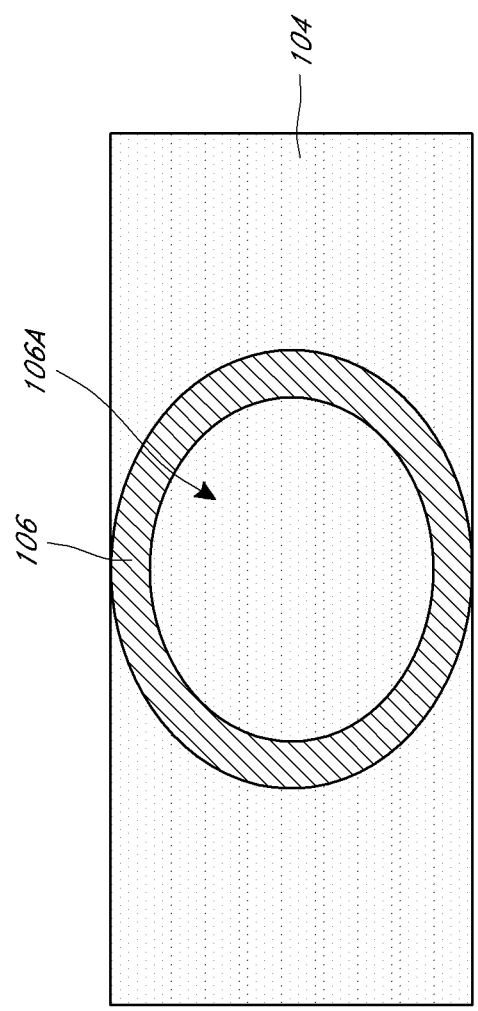
FIG. 2 shows a top-down plan view of a portion of an example energy storage cell according to one embodiment.

FIG. 2 shows a top down plan view of an example of an electrode divider ring 106 seated on a second graphite film 104, with an opening of the electrode divider ring 106 and the second graphite film 104 forming an inner volume 106A within the electrode divider ring 106 adjacent to the second graphite film 104. In the embodiment shown in FIG. 2, the electrode divider ring 106 has a circular or substantially circular shape and the second graphite film 104 has a rectangular or substantially rectangular shape. As described herein, an electrode divider ring, such as the electrode divider ring 106, can be coupled to a graphite film, such as the first graphite film 102 and/or the second graphite film 104 by pressing the electrode divider ring against the graphite film, or vice versa, such that at least a portion of the electrode divider ring extends into the graphite film. For example, a portion of an edge of the electrode divider ring may be extended into the graphite film to a desired depth, without completely penetrating through the thickness of the graphite film, to securely position the electrode divider ring onto the graphite film and create a sealed interface between the electrode divider ring and the graphite film. A portion of the electrode divider ring may be extended into the graphite film to a desired depth, without completely penetrating through the thickness of the graphite film, such that the graphite film can maintain sufficient electrical conductivity between the ultracapacitor cell and an external circuit. In some embodiments, a process of coupling an electrode divider ring with a graphite film can include a compression seating step, such as the use of a compression load to seat the electrode divider ring into the graphite film. Other suitable methods of applying a force upon the electrode divider and/or the graphite film may also be possible.

The graphite film and the electrode divider ring may be configured to withstand operating conditions of the ultracapacitor cell. In some embodiments, the graphite film and the electrode divider ring can be chemically and/or thermally stable with respect to an aqueous and/or non-aqueous electrolyte under operating conditions of the ultracapacitor cell. The graphite film, which can be imperforated or substantially imperforated, and the seal between the graphite films and the electrode divider ring can provide a sealed ultracapacitor cell, facilitating fabrication of an ultracapacitor cell which can reliably enclose its contents across various operating conditions. For example, an ultracapacitor cell made of the graphite film coupled to the electrode divider may be used with a high concentration aqueous electrolyte, such as sulfuric acid, for example, at a concentration of about 0.5 moles per liter (M) to about 2 M. Such embodiments can provide improved capacitor performance due to increased conductance of aqueous electrolytes. In some embodiments, the ultracapacitor cell made of the graphite film coupled to the electrode divider can be compatible with a non-aqueous electrolyte, such as an acetonitrile based electrolyte. For example, an electrolyte can be employed comprising acetonitrile and a salt, such as a salt comprising a tetrafluoroborate anion and/or a quaternary ammonium cation, including tetraethyl ammonium tetrafluoroborate. In some embodiments, the graphite films can replace at least a portion of a current collector component susceptible to degradation by an electrolyte. For example, a metallic current collector, such as an aluminum current collector can be replaced by such a graphite film. An ultracapacitor cell made of the graphite film coupled to the electrode divider ring may facilitate operation of the ultracapacitor cell at increased operating voltages, such as an operating voltage of about 3.0 Volts.

Embodiments of an electrode divider ring can have a variety of shapes and/or dimensions. An electrode divider ring can have a circular or substantially circular outer shape, and/or a rectangular or substantially rectangular outer shape, with a similarly or differently shaped inner opening. A shape and/or a dimension of the electrode divider ring may or may not be similar to that of a graphite film to which the electrode divider ring is coupled. For example, the electrode divider ring can have a circular or substantially circular shape while the graphite film has a rectangular or substantially rectangular shape, or vice versa. The electrode divider ring can have a height and/or a diameter configured to accommodate other components of the ultracapacitor cell within the divider ring inner volume (such as inner volume 106A in FIG. 2) and the enclosure formed at least in part by the electrode divider ring and the graphite film.

The electrode divider ring can comprise any number of suitable materials. The electrode divider ring can comprise or consist essentially of an electrically insulating material, for example facilitating electrical insulation between the two graphite films into which the electrode divider may be embedded. The electrode divider ring can comprise or consist essentially of a material compatible with other ultracapacitor cell components, and can be thermally and/or chemically stable during an operation of the ultracapacitor cell, while providing sufficient structural support for the ultracapacitor cell. For example, the electrode divider ring may be configured to be impervious or substantially impervious to an ultracapacitor cell electrolyte solvent, for example, under ultracapacitor cell operating conditions. In some embodiments, the electrode divider ring can comprise or consist essentially of a polymeric material, such as a polyimide. In some embodiments, the electrode divider ring can comprise or consist essentially of a ceramic material. In some embodiments, the electrode divider ring can comprise or consist essentially of glass.

In some embodiments, a suitable graphite film can contain no or substantially no binder material. In some embodiments, a suitable graphite film may include greater than about 80%, including about 90% by weight of a carbon content. For example, a suitable graphite film may include greater than or equal to about 95% by weight of a carbon content. In some embodiments, a graphite film may comprise or consist essentially of a specialty grade graphite material, such as a graphite foil made of an expanded graphite material, and/or an expanded graphite material having impurities at less than about 50 parts per million. For example, a suitable graphite film may comprise about 95% by weight or more of a graphite material. Other types of graphite and/or carbon based films may also be suitable.

In some embodiments, a suitable graphite film composition can be compressed, for example, by a roll mill, to form the graphite film. In some embodiments, the mixture comprising a composition for a graphite film can be blended and extruded to form a flexible film-like structure having a thickness to enable, for example, a desired mechanical strength and/or electrical conductivity.

In some embodiments, a graphite film can include an amount of a binder material to improve a structural integrity of the graphite film while maintaining or substantially maintaining a desired electrical conductivity of the graphite film. For example, the graphite film may comprise an amount of carbon within a range of from about 85% to about 90%, by weight. In some embodiments, a graphite film can include no more than about 15% by weight of a binder material. Suitable binder material may include, but are not limited to, polytetrafluoroethylene (PTFE), polypropylene, polyethylene, co-polymers thereof, and/or combinations thereof.

A graphite film can have various suitable thicknesses. In some embodiments, a graphite film can have a thickness of about 100 microns (µm) to about 2000 microns, including about 300 microns to about 1000 microns, including about 500 microns. In some embodiments, a graphite film can have a thickness of about 40 microns to about 300 microns, including from about 100 microns to about 200 microns. In some embodiments, a graphite film can have a thickness of about 40 microns to about 90 microns, including from about 50 microns to about 80 microns. Graphite films of an ultracapacitor cell may or may not have the same or substantially the same thicknesses, such as the first graphite film 102 and the second graphite film 104 of FIG. 1A. In some embodiments, one or both of the first graphite film 102 and the second graphite film 104 can have a thickness of about 75 microns.

Figure 3:
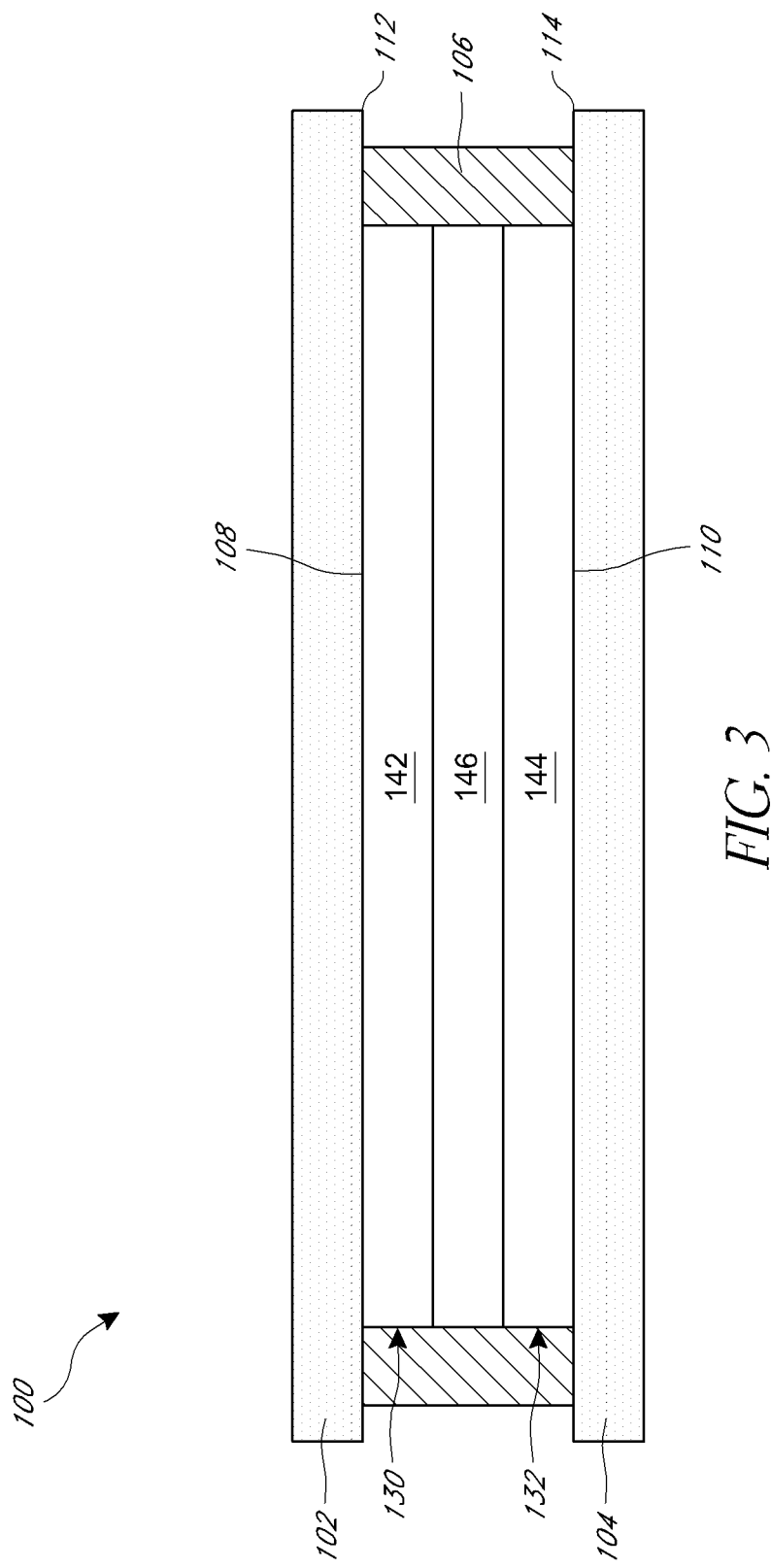
FIG. 3 shows a cross-sectional view of an example energy storage cell according to one embodiment.

FIG. 3 shows a cross-sectional view of the ultracapacitor cell 100, showing, at least in part, additional components on an interior of the ultracapacitor cell 100. The ultracapacitor cell 100 may include a first electrode 130, which includes a first electrode film 142, adjacent the surface 112 of the first graphite film 102. The ultracapacitor cell 100 may include a second electrode 132 separator 146 between the first electrode 130 and the second electrode 132, which includes a second electrode film 144, adjacent the surface 114 of the second graphite film 104. The ultracapacitor cell 100 can include a separator 146 between the first electrode 130 and the second electrode 132. For example, the separator 146 may be between the first electrode film 142 and the second electrode film 144. The separator 146, the first electrode film 142 and the second electrode film 144 may be immersed in an electrolyte, either separately, or individually. In some embodiments, the enclosure formed by the graphite films 102, 104 and the electrode divider ring 106 surrounds and encloses the electrolyte, the first electrode film 142, the second electrode film 144, and the separator 146 within inner volume 106A (FIG. 2).

In some embodiments, the inner volume 106A of the electrode divider ring 106 can have a shape and/or a dimension configured to accommodate the first electrode 130, the second electrode 132, and/or the separator 146. For example, the electrode divider ring 106 may have an inner diameter, width, or perimeter larger than an outer diameter, width, or perimeter of each of the electrode films 142, 144 and the separator 146. The electrode divider ring 106 can have a shape the same as, similar to, or different from one or more components contained within the inner volume 106A, such as the electrode films 142, 144 and the separator 146. For example, the electrode divider ring 106, the electrode films 142, 144 and the separator 146 can each have a circular or substantially circular shape.

In some embodiments, the electrode divider ring 106 can have a height larger than a combined thickness of the electrode films 142, 144 and the separator 146. For example, a portion of the electrode divider ring 106 extending between the surfaces 112, 114 of the two graphite films 102, 104, respectively, may have a height great enough to sufficiently accommodate the first electrode film 142, the second electrode film 144, and the separator 146, while being sufficiently low enough to provide an ultracapacitor cell 100 having a reduced volume. Such sizing can facilitate use of the ultracapacitor cell 100 in various space constrained applications. In some embodiments, the height of the electrode divider ring may be greater than from about 5 microns to about 40 microns than a combined thickness of capacitor components housed within the inner volume of the electrode divider ring, such as the electrode(s) and/or separator(s) between the two graphite films. As a non-limiting example, in an ultracapacitor cell having an example configuration as shown in FIG. 3, each of two electrode films 142, 144 may have a thickness of about 100 microns, and the separator 146 may have a thickness of about 30 microns. In this example, the electrode divider ring 106 may have a height greater than about 230 microns for example, in a range between about 235 microns to about 270 microns, or, in one example, about 250 microns. Other thicknesses for electrode films, separators, and/or electrode divider rings may also be possible.

Figure 4:
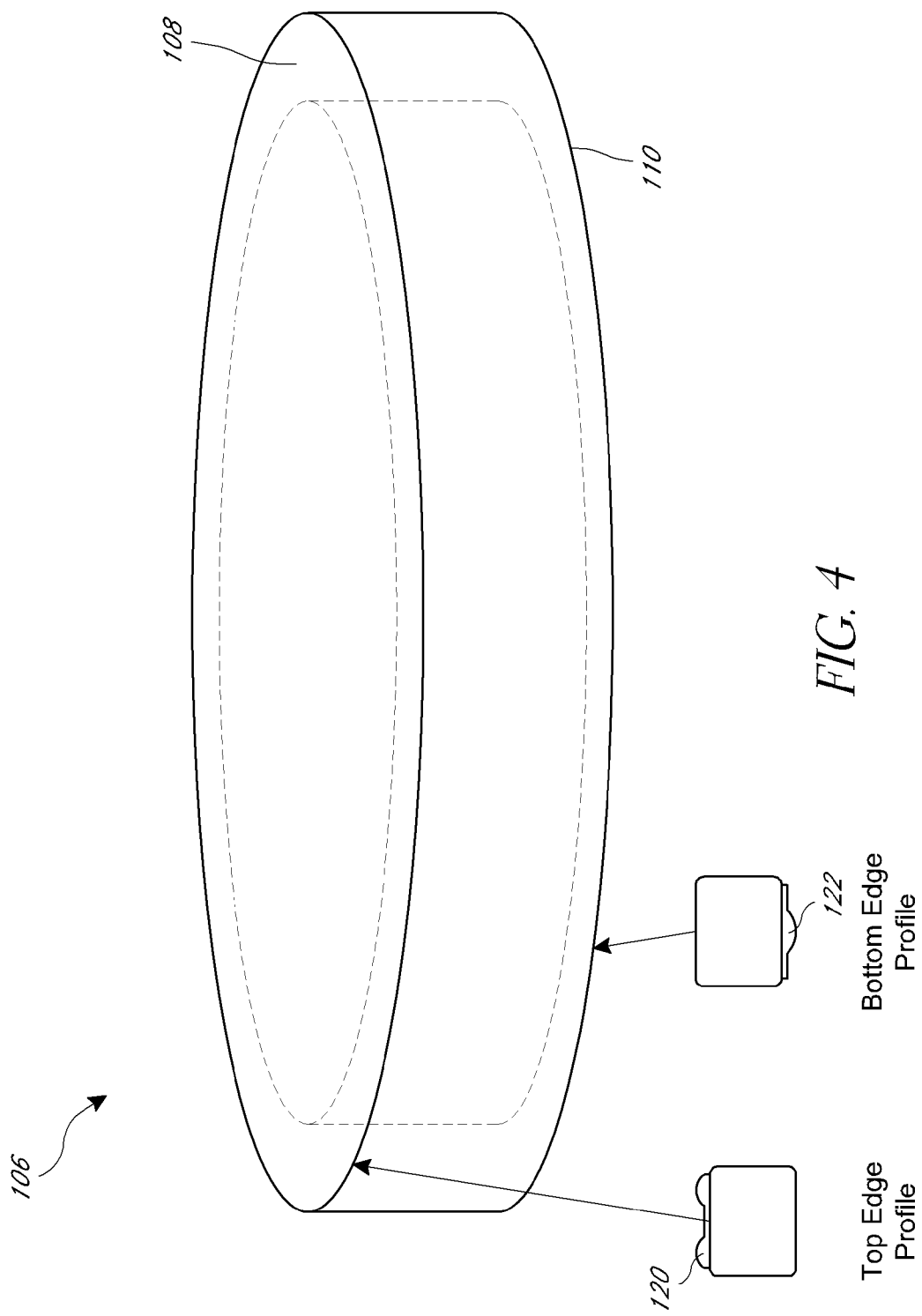
FIG. 4 shows a perspective view of an example electrode divider ring according to one embodiment.

FIG. 4 shows a perspective view of an example of the electrode divider ring 106. The divider rings described herein can have edges with various cross-sectional edge profiles, to improve the sealing and engagement between the divider rings and one or more of the corresponding graphite films. A non-linear edge profile can facilitate formation of the sealed interface between the electrode divider ring and a corresponding graphite film, and/or placement of the electrode divider ring in a desired location on the corresponding graphite film. For example, the first edge of the electrode divider ring having a depression can extend into the first graphite film of an ultracapacitor cell and the second opposing edge of the electrode divider ring having a protrusion can extend into the second graphite film of the ultracapacitor cell for forming a sealed enclosure. A protrusion and/or depression of the electrode divider ring edge can have any of a number of suitable shapes.

Referring to FIG. 4, the first edge 108 of electrode divider ring 106 can have a first edge profile 120, and/or the second opposing edge 110 can have a second edge profile 122. The edge profiles between the different divider rings shown herein can be similar or dissimilar with respect to each other. As shown in FIG. 4, in some embodiments, opposing edges 108, 110 of the electrode divider ring 106 can have dissimilar edge profiles 120, 122. In some embodiments, one or both of opposing edges 108, 110 can have a substantially non-flat or non-linear profile, to improve the sealing and engagement between divider ring 106 and the graphite films 102, 104 (FIGS. 1A-3). For example, referring again to FIG. 4, one or both of opposing edges 108, 110 can have edge profiles that include one or more protrusions and/or depressions. Referring to FIG. 4, for example, an electrode divider ring 106 can have a first edge profile 120 at least a portion of which includes a depression, and a second edge profile 122 at least a portion of which includes a protrusion. As shown in FIG. 4, in some embodiments, the first edge profile 120 can include a depression formed between two protrusions. The depression in the first edge profile 120 can have a flat profile and the protrusions, such as those in the first edge profile 120, or that in the second edge profile 122, can have a rounded shape. The protrusions and/or depressions that form the edge profiles of the edges 108 and 110 can be various curved, linear, regular or irregular shapes. For example, the edge profile can have a triangular or a substantially triangular shaped protrusion or depression. The edge profiles can include one or more concavities or convexities.

In some embodiments, a protrusion and/or a depression of an edge profile can extend along a portion of the edge, an entire length (e.g., perimeter) of the edge or substantially the entire length of the edge of the electrode divider ring. In some embodiments, a protrusion and/or a depression of an edge profile can be positioned at one or more distinct positions along the length of the edge of the electrode divider ring, including being positioned at one or more regular intervals along the length of the edge of the electrode divider ring. In some embodiments, a protrusion and/or a depression of an edge profile can be positioned at two, three, four, or more positions, at regular intervals along the length of the edge of the electrode divider ring. In some embodiments, one or more protrusions and/or depressions can be at any one position along the edge of the electrode divider ring.

An electrode film, such as the first electrode film 142 and/or the second electrode film 144 as shown in FIG. 3, can include an active material component, a binder component and/or an additive component. The active material component may comprise a material suitable to provide a high surface area for the electrode. The active material can have a porosity, provided for example, through a distribution of micropores, mesopores, and/or macropores, optimized for a desired ultracapacitor performance, such as a power density and/or energy density performance. The active material may comprise a carbon material, for example a porous carbon material. In some embodiments, the active material includes but is not limited to particles of activated carbon. In some embodiments, an electrode film can comprise or consist essentially of graphene, activated carbon, and/or an oxide material, such as an oxide material exhibiting capacitive properties. In some embodiments, electrode films of an ultracapacitor cell can have similar or dissimilar compositions.

The binder component may provide structural support for the electrode. For example, the binder component may comprise one or more polymers, the polymers providing a polymeric matrix support structure for the active material component of the electrode. In some embodiments, the binder component can comprise a fluoropolymer (e.g., polytetrafluoroethylene, PTFE), a polypropylene, a polyethylene, co-polymers thereof, and/or polymer blends thereof.

In some embodiments, the electrode film can comprise a conductive additive component. The conductive additive component may improve an electrical conductivity of the electrode film. For example, the conductive additive component may comprise conductive carbon particles and/or carbon fibers, including but not limited to graphite and/or graphene. Other active material components, binder components, and/or additive components may also be suitable.

An electrode film can have a dimension such as a thickness and/or a composition optimized for a desired ultracapacitor performance, for example a desired ultracapacitor capacitance and/or resistance to provide a desired ultracapacitor energy density and/or power density performance. In some embodiments, an electrode film can have a thickness of about 50 microns (μm) to about 200 micron, including about 80 microns about to about 150 microns. For example, an electrode film can have a thickness of about 100 microns. In some embodiments, an electrode film can comprise from about 50% to about 99% by weight of an active material component such as activated carbon, and/or an oxide having capacitive properties, including from about 60% to about 90% by weight. In some embodiments, an electrode film can comprise from about 1% to about 50% by weight of a binder component. In some embodiments, an electrode film can comprise up to about 30% by weight of an additive component, including for example a conductive additive component for promoting electrical conductivity of the electrode.

A separator may be configured to permit a transport of ionic species between a first electrode and a second electrode, while preventing an electrical short between the first electrode and the second electrode. A separator can comprise or consist essentially of an electrically insulating porous material. In some embodiments, the separator can be a polymeric material, glass material, a ceramic material, a natural fiber material such as a woven and/or nonwoven natural fiber, combinations thereof, and/or the like. In some embodiments, the separator can comprise or consist essentially of paper. The separator can have a thickness to facilitate transport of ionic species across the separator while providing desired electrical separation between the two electrodes. In some embodiments, a separator can have a thickness of about 20 microns ($\mu$m) to about 100 micron, including about 30 microns about to about 80 microns. For example, the separator can have a thickness of about 50 microns.

Figure 5:
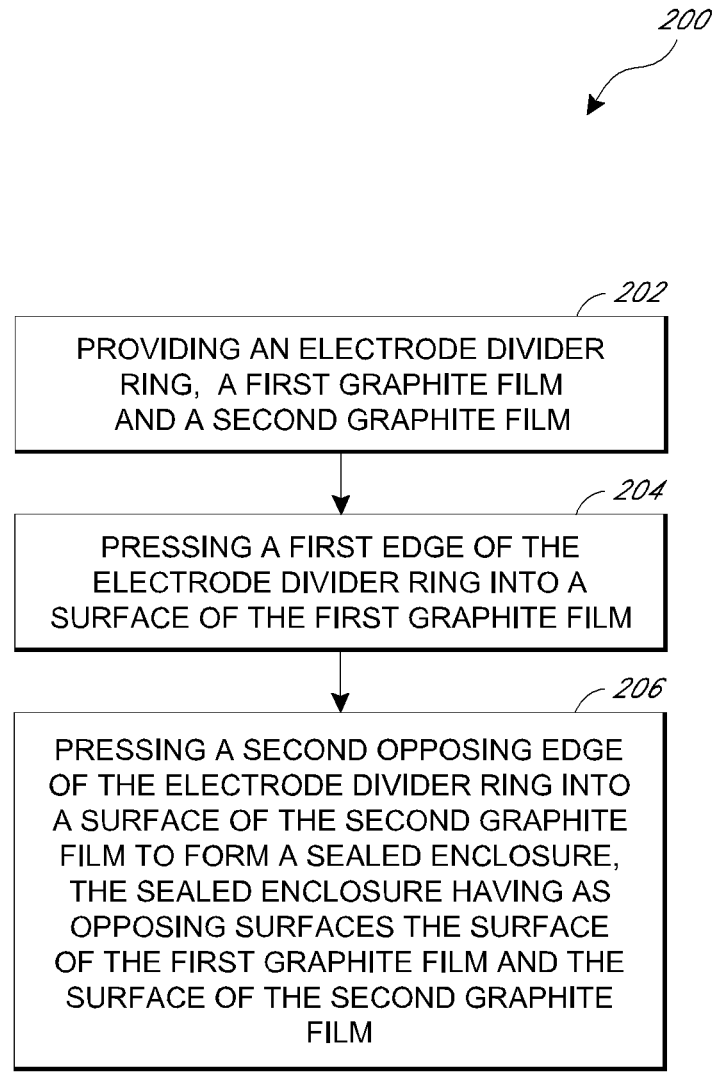
FIG. 5 shows an example process of fabricating an energy storage cell.

FIG. 5 shows an example process 200 for fabricating an ultracapacitor cell according to an embodiment. In block 202, for example, an electrode divider ring, a first graphite film and a second graphite film can be provided, such as the electrode divider ring 106, the first graphite film 102 and the second graphite film 104 as shown in FIGS. 1A-3. In block 204, a first edge of the electrode divider ring can be pressed into a surface of the first graphite film. In block 206, a second opposing edge of the electrode divider ring can be pressed into a surface of the second graphite film to form a sealed enclosure with the first graphite film. For example, the sealed enclosure may include as opposing surfaces the surfaces of the first graphite film and the second graphite film into which edges of the electrode divider ring are pressed. Pressure may be applied to one or both of a graphite film and an electrode divider ring for coupling the electrode divider ring to the graphite film. As described herein, an amount of pressure may be applied to the electrode divider ring and/or first graphite film such that the electrode divider ring is positioned at a desired depth into the graphite film to facilitate securely positioning the electrode divider ring onto the graphite film and creating a sealed interface between the electrode divider ring and the graphite film, without penetrating the graphite film.

In some embodiments, an electrode can be attached to a graphite film prior to coupling of the graphite film and an electrode divider ring. For example, an electrode film can be applied to a surface of a graphite film prior to coupling the graphite film to an electrode divider ring, the electrode film being applied to a surface of the graphite film facing an interior of an opening of the electrode divider ring. In some embodiments, a first electrode film and/or a second electrode film can be applied onto a surface of a respective graphite film prior to coupling the graphite films to an electrode divider ring by using a lamination process, such as a heated lamination step in a continuous roll-to-roll process. In some embodiments, the surface of the first graphite film and/or the second graphite film upon which an electrode film is applied can be coated with an adhesive film prior to applying the electrode film to facilitate adhesion between the electrode film and the respective graphite film. The adhesive film can include any number of suitable adhesive materials, including a conductive adhesive material, for example a conductive carbon filled adhesive material and/or a conductive thermoplastic adhesive material. The adhesive material may be applied in a variety of shapes, facilitating adhesion of electrode films having varying shapes. For example, the adhesive film may have a circular shape, facilitating adhesion of an electrode film having the circular shape. In some embodiments, portions of an electrode film applied outside of a region covered by an adhesive film can be removed during the fabrication process, leaving an electrode film having the shape of the adhesive film on the graphite film.

An example of a process for assembling an ultracapacitor cell can include applying a first electrode film onto a surface of a first graphite foil, and applying a second electrode film onto a surface of a second graphite foil. An electrode divider ring can be pressed onto the surface of the first graphite foil to form a sealed interface between the first graphite foil and the electrode divider ring. For example, one or more edge portions along the opening of the electrode divider ring can be pressed into the surface of the first graphite film, forming a sealed interface between the electrode divider ring and the first graphite film. The electrode divider ring can be placed relative to the first graphite foil such that the opening of the electrode divider ring surrounds the first electrode film. A separator can be placed within the opening of the electrode divider ring over the first electrode film. The separator can have a shape and/or a dimension (e.g., a thickness) to enable sufficient electrical separation between the electrodes of the ultracapacitor while permitting desired ionic transport across the separator between the electrodes. Subsequently, the second graphite film having the second graphite film attached can be coupled to the electrode divider ring to form a sealed enclosure, for example by pressing the second graphite film onto the electrode divider ring or vice versa, such that the opening of the electrode divider ring surrounds the second electrode film. In some embodiments, the second graphite film can be pressed into one or more edge portions along the opening of the electrode divider ring to create a sealed interface between the electrode ring divider and the second graphite film, the one or more edge portions of the electrode divider ring being on a portion of the electrode divider ring opposite that coupled to the first graphite film.

In some embodiments, the separator can be impregnated with an electrolyte before insertion into an opening of the electrode divider ring. In some embodiments, the first electrode film and/or the second electrode film can be impregnated with an electrolyte before coupling the electrode divider ring with the respective graphite film to which the first electrode film and/or the second electrode film is attached. In some embodiments, the first electrode film and/or the second electrode film can be impregnated with an electrolyte after being attached to a respective graphite film and prior to coupling the respective graphite film to an electrode divider ring. As described herein, suitable electrolyte can be aqueous or non-aqueous.

An ultracapacitor cell, such as the ultracapacitor cell 100 as shown in FIG. 1 fabricated according to the example process 200 can be reliably sealed under operating conditions of the ultracapacitor cell, providing an ultracapacitor cell which can be compatible with an aqueous and/or non-aqueous electrolyte. For example, the ultracapacitor cell may be used with high molarity aqueous electrolyte. For example, the ultracapacitor cell may be used with a non-aqueous electrolyte, including a moderate molarity non-aqueous electrolyte. The ultracapacitor cell can provide an improved performance, including for example an increased ultracapacitor operating voltage. For example, an ultracapacitor cell having a non-aqueous electrolyte fabricated using the example process 200 can be configured to operate at an increased operating voltage. The example process 200 can provide a scalable process for reliably fabricating ultracapacitor cells configured to operate at increased operating voltages, such as at an operating voltage of about 3 Volts (V).

Figure 6A:
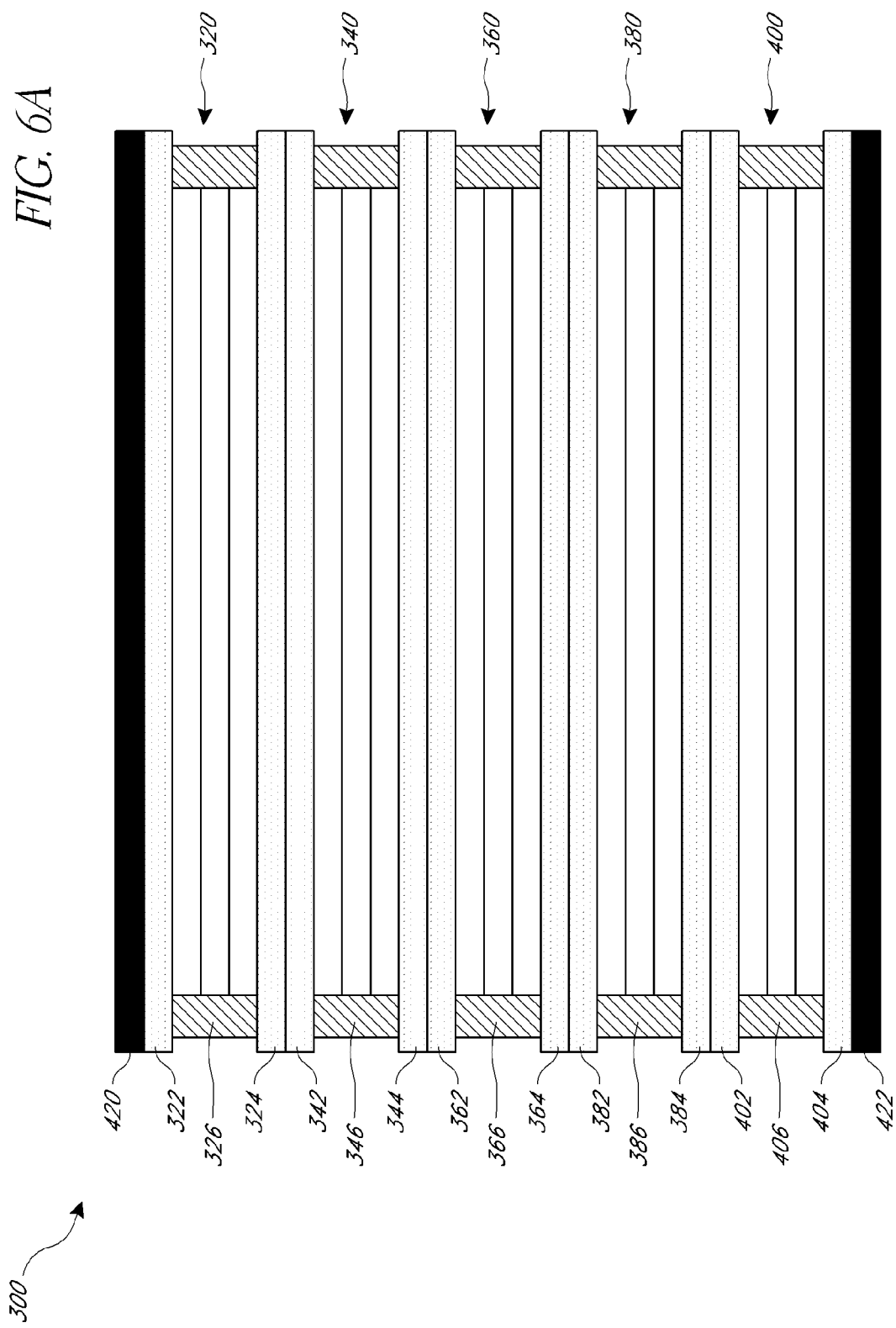
FIG. 6A shows a cross-sectional view of an example energy storage device having a stacked configuration according to one embodiment.

In some embodiments, an energy storage device can include a plurality of individual energy storage cells. For example, an ultracapacitor can include a plurality of individual ultracapacitor cells. Referring to FIG. 6A, according to an embodiment, an energy storage device 300 may include five individual ultracapacitor cells in a stacked configuration. For example, the individual ultracapacitor cells may be connected in electrical series. In some embodiments, the energy storage device 300 can include a first ultracapacitor cell 320 adjacent a second ultracapacitor cell 340, a third ultracapacitor cell 360 adjacent the second ultracapacitor cell 340, a fourth ultracapacitor cell 380 adjacent the third ultracapacitor cell 360 and a fifth ultracapacitor cell 400 adjacent the fourth ultracapacitor cell 380. Cells 320, 340, 360, 380 and 400 can be similar to cell 100 (FIGS. 1A-4). In some embodiments, each ultracapacitor cell can include a first graphite film, such as graphite films 322, 342, 362, 382, 402, a second graphite film, such as graphite films 324, 344, 364, 384, 404, and an electrode divider ring, such as electrode divider rings 326, 346, 366, 386, 406, between the respective first graphite film and second graphite film. Adjacent graphite films may be in electrical contact with one another. For example, the second graphite film 324 of the first ultracapacitor cell 320 may be in electrical contact with the first graphite film 342 of the second ultracapacitor cell 340, and so forth. In some embodiments, adjacent graphite films corresponding to adjacent ultracapacitor cells in the ultracapacitor stack of energy storage device 300 can be in contact with one another to facilitate electrical coupling between the adjacent ultracapacitors. For example, adjacent graphite films corresponding to adjacent ultracapacitor cells in the stack of ultracapacitor cells can be in direct contact (e.g., bare graphite films in direct contact with one another). In some embodiments, adjacent graphite films corresponding to adjacent ultracapacitor cells in the stack of ultracapacitor cells can be coupled to one another using an adhesive, including, for example, an electrically conductive adhesive, or other intervening conductive components. The individual ultracapacitor cells may or may not have similar or substantially similar configurations.

In some embodiments, one or more adjacent graphite films shown in FIG. 6A, such as graphite films 324 and 342, 344 and 362, 364 and 382, and/or 384 and 402, can be one continuous or substantially continuous graphite film. For example, adjacent graphite films 324 and 342 of FIG. 6A can be one continuous or substantially continuous graphite film, instead of being two distinct graphite films. In some embodiments, an electrode may be attached to each of two opposing surfaces of a graphite film such that the graphite film can serve as a current collector for two adjacent energy storage cells. For example, a second electrode film of a first energy storage cell can be applied to a first surface of a graphite film and first electrode film of a second energy storage cell can be applied to a second opposing surface of the graphite film such that the graphite film can serve as a current collector for both the first energy storage cell and the second energy storage cell.

In some embodiments, the energy storage device 300 may include electrically conductive components coupled to each of the two graphite films at each end of the ultracapacitor stack to facilitate electrical contact between the energy storage device 300 and an external circuit. For example, a first electrically conductive component 420 may be coupled to the first graphite film 322 of the first ultracapacitor cell 320 and a second electrically conductive component 422 may be coupled to the second graphite film 404 of the fifth ultracapacitor cell 400. The electrically conductive components 420, 422 can comprise or consist essentially of any number of electrically conductive materials, including a metallic material. For example, one or both of the electrically conductive components 420, 422 can be a film made of an aluminum material, such as an aluminum foil. In some embodiments, one or both of the electrically conductive components 420, 422 can be a film including other types of metals, such as copper, nickel, platinum, silver, alloys thereof, and/or the like. Electrically conductive foils may be attached onto the respective graphite film through a heated pressure process, such as a lamination process. In some embodiments, an energy storage device, such as the energy storage device as shown in FIG. 6A, having one or more individual energy storage cells made at least in part of a graphite film coupled to an electrode divider ring, may exhibit improved ability to be reliably sealed under operating conditions of the ultracapacitor cell, reducing electrical shorting between the individual energy storage cells. In some embodiments, energy storage cells, such as those of the energy storage device shown in FIG. 6A, can facilitate operation at increased operating voltages, such as at an operating voltage of about 3 Volts (V) per cell. For example, an energy storage device having five ultracapacitor cells as shown in FIG. 6A, where the five individual ultracapacitor cells are coupled to one another in electrical series can provide a total voltage of about 15 Volts (V), such as a total voltage between the conductive components 420, 422.

Figure 6B:
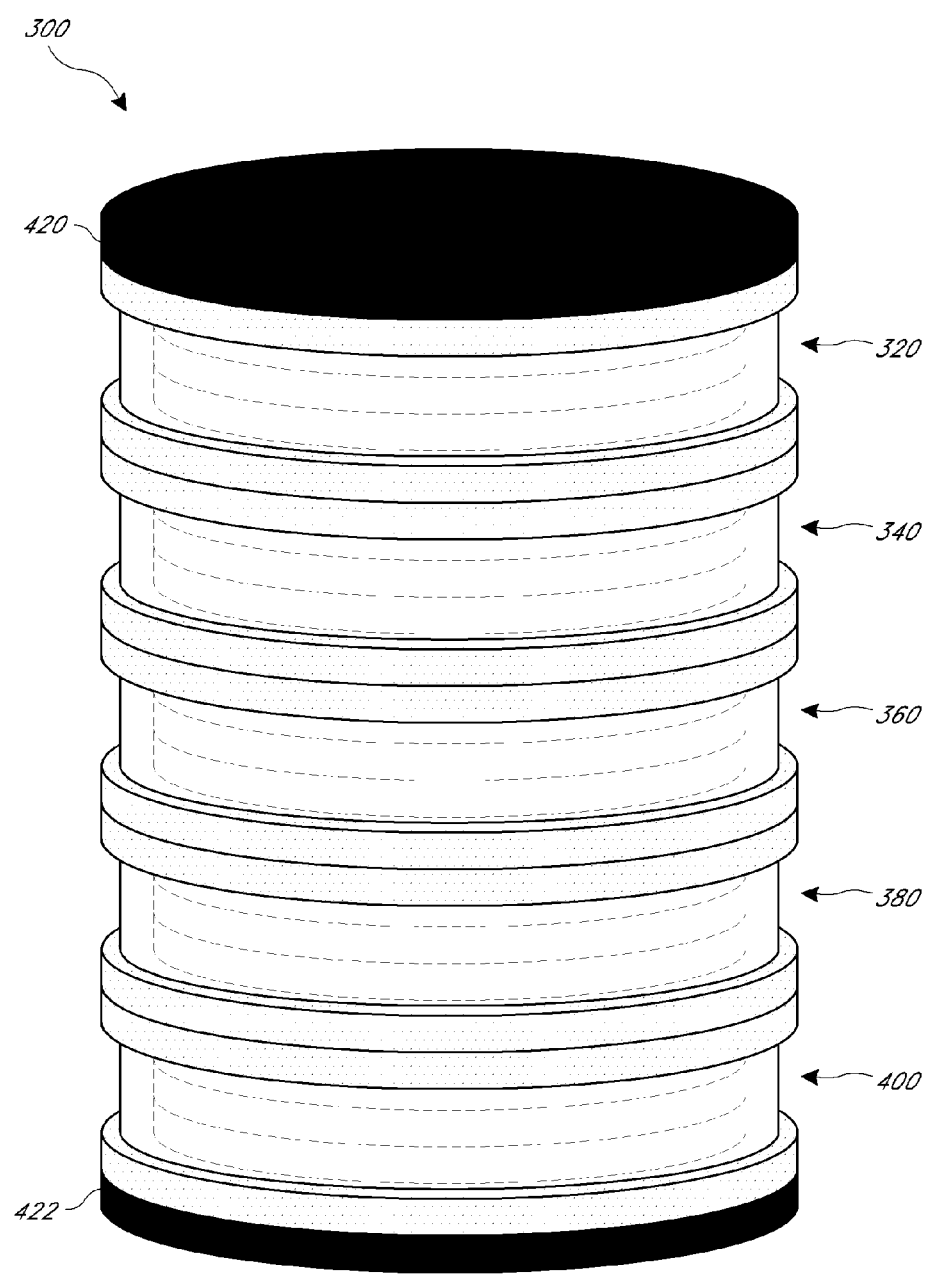
FIG. 6B shows a perspective view of the example energy storage device of FIG. 6A.

FIG. 6B shows a perspective view of the energy storage device 300 shown in FIG. 6A. FIG. 6B shows each of the ultracapacitor cells 320, 340, 360, 380 and 400, having electrode divider rings and graphite films of a circular or substantially circular shape. For example, each of the ultracapacitor cells 320, 340, 360, 380 and 400 may have a configuration similar to the other, forming an energy storage device 300 having a stack of five ultracapacitor cells having the same or similar configuration. As described herein, one or more sets of adjacent graphite films of the device 300 may be made of one continuous or substantially continuous graphite film, instead of two distinct graphite films. The device 300 can include other quantities of ultracapacitor cells, other types of energy storage cells (e.g., individual battery cells and/or battery-capacitor hybrid cells), and individual energy storage cells with shapes other than the approximately circular shape shown.

Referring to FIG. 6B, a first end of the stack of ultracapacitors of the energy storage device 300 can be coupled to the first electrically conductive component 420 and a second end of the stack of ultracapacitor cells can be coupled to the second electrically conductive component 422. A graphite film of the first ultracapacitor cell 320 is shown as being coupled the first electrically conductive component 420 and a graphite film of the fifth ultracapacitor cell 400 is shown as being coupled to the second electrically conductive component 422, each of the first electrically conductive component 420 and the second electrically conductive component 422 having a shape and size similar to the corresponding graphite film to which it is coupled. For example, the first electrically conductive component 420 and the second electrically conductive component 422 can have a circular or substantially circular shape, and a diameter the same as or similar to a diameter of the corresponding graphite film to which they are coupled.

In some embodiments, an electrically conductive component can have a size and/or shape different from that of the graphite film to which it is coupled. For example, the electrically conductive component may be significantly larger or smaller in size than the graphite film to which it is coupled. For example, the electrically conductive component may have one or more linear or substantially linear edges, while the corresponding graphite film may have a circular or substantially circular shape, or vice versa.

According to one embodiment, the energy storage device 300 can have five individual ultracapacitor cells (e.g., bipolar) each individual ultracapacitor cell having a configuration (e.g., an ultracapacitor component and/or composition) to provide a capacitance of about 6.7 Farads (F) and an operating voltage of about 2.7 Volts (V). For example, the energy storage device 300 can include the five individual ultracapacitor cells connected in electrical series to provide a device capacitance of about 1.3 Farads and a device operating voltage of about 13.5 Volts, or an energy performance of about 0.03 Watt-hour (W-h). In some embodiments, an operating voltage of an individual ultracapacitor cell can be about 3.0 Volts. In some embodiments, each ultracapacitor cell can have a first graphite film and a second graphite film each having a thickness of about 76 microns (μm), a first electrode film and a second electrode film each having a thickness of about 100 microns, and a separator having a thickness of about 50 microns. The first electrode films and the second electrode films may have a circular or substantially circular shape, each electrode film having a diameter of about 50 millimeters (mm). Each individual ultracapacitor cell may have an electrolyte solvent comprising acetonitrile and an electrolyte salt comprising tetraethyl ammonium tetrafluoroborate (TEATFB), at an electrolyte salt concentration of about 1 molar (M).

According to another embodiment, an energy storage device can include 200 individual ultracapacitor cells in a stacked configuration connected in series, each having a configuration (e.g., an ultracapacitor component dimension and/or composition) to provide a capacitance of about 6.7 Farads (F) and an operating voltage of about 2.7 Volts (V). For example, the energy storage device according to the embodiment can provide a device operating voltage of about 540 Volts, a capacitance value of about 0.034 Farads or an energy performance of about 2.8 Watt-hours. In some embodiments, an operating voltage of an individual ultracapacitor cell can be about 3.0 Volts.

Figure 7:
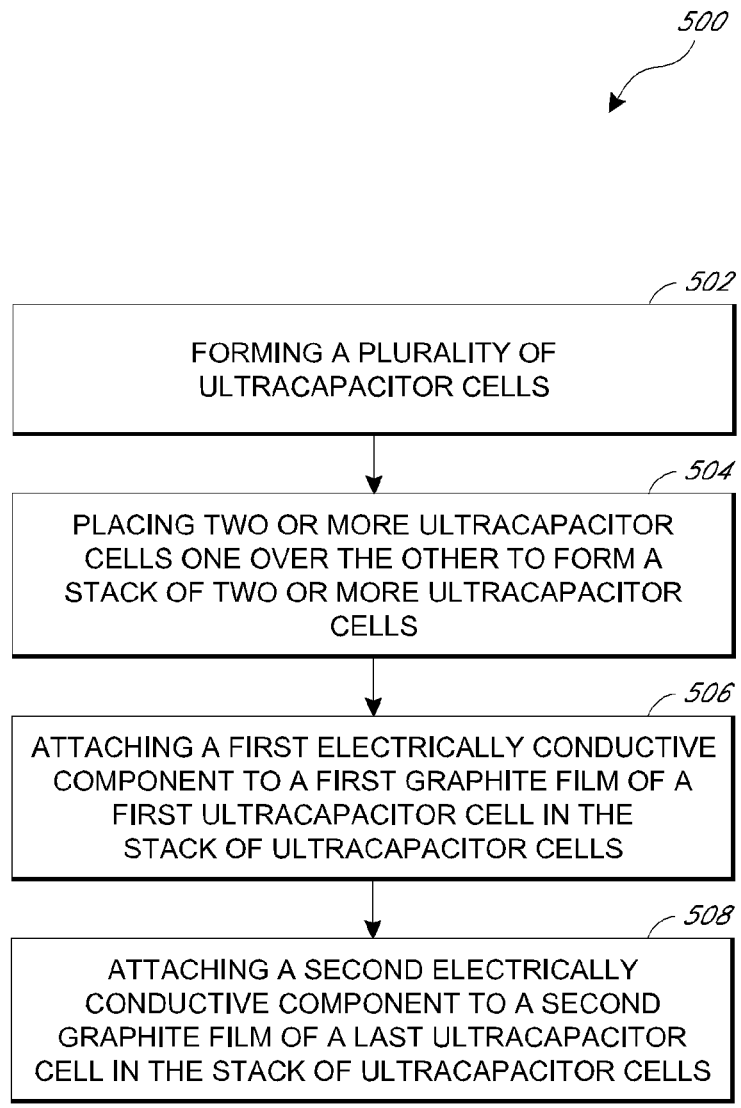
FIG. 7 shows an example process of fabricating an energy storage device.

FIG. 7 shows an example process 500 for fabricating an energy storage device including a plurality of ultracapacitor cells in a stacked configuration. In block 502, a plurality of ultracapacitor cells can be formed. For example, one or more of the plurality of ultracapacitor cells may be formed according to one or more processes as described herein. In block 504, the plurality of ultracapacitor cells can be placed one over the other to form a stack including the plurality of ultracapacitor cells. For example, the plurality of ultracapacitor cells can be aligned and stacked one over the other to facilitate formation of the energy storage device having the stack configuration. Adjacent ultracapacitor cells can be placed one over the other and in electrical contact with one another such that the two adjacent ultracapacitor cells are aligned and can be coupled in electrical series. In some embodiments, as described herein, two adjacent energy storage cells in an energy storage device having a stacked configuration can share one continuous or substantially continuous graphite film, instead of having two distinct adjacent graphite films. For example, a first electrode divider ring of a first adjacent energy storage cell may be coupled to a first surface of the shared graphite film and a second electrode divider ring of a second adjacent energy storage cell may be coupled to a second opposing surface of the shared graphite film to facilitate creation of a sealed enclosure for each of the first energy storage cell and the second energy storage cell. In some embodiments, the remainder of the first and second adjacent energy storage cells can be fabricated using one or more processes as described herein. In block 506, a first electrically conductive component can be attached to a graphite film of an ultracapacitor cell, such as the first graphite film of the first ultracapacitor cell in the plurality of stacked ultracapacitor cells. In block 508, a second electrically conductive component can be attached to a graphite film of an ultracapacitor cell, such as the second graphite film of the last ultracapacitor cell in the plurality of stacked ultracapacitor cells. The first and the second electrically conductive components may be attached to each of its corresponding ultracapacitor cells according to one or more processes as described herein.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. An energy storage device, comprising:
   a first graphite film;
   a second graphite film; and
   an electrode divider ring entirely disposed between the first graphite film and the second graphite film, wherein the first graphite film, the second graphite film, and the electrode divider ring form a sealed enclosure,
   wherein at least a portion of a first edge of the electrode divider ring extends into the first graphite film and wherein at least a portion of a second opposing edge of the electrode divider ring extends into the second graphite film, such that the electrode divider ring is embedded into the first and second graphite films.

2. The energy storage device of claim 1, wherein at least one of the first edge and the second opposing edge comprises at least one of a protrusion and a depression.

3. The energy storage device of claim 2, wherein the at least one protrusion and depression extends along an entire length of an electrode divider ring edge.

4. The energy storage device of claim 1, further comprising a first electrode film on a surface of the first graphite film facing the electrode divider ring, and a second electrode film on a surface of the second graphite film facing the electrode divider ring.

5. The energy storage device of claim 4, further comprising a separator between the first electrode film and the second electrode film.

6. The energy storage device of claim 4, wherein at least one of the first electrode film and the second electrode film further comprises at least one of an activated carbon material, a graphene material, and an oxide material.

7. The energy storage device of claim 1, further comprising an aqueous electrolyte.

8. The energy storage device of claim 1, further comprising a non-aqueous electrolyte.

9. The energy storage device of claim 1, wherein the energy storage device comprises an ultracapacitor.

10. The energy storage device of claim 1, wherein the energy storage device comprises a battery.

11. An energy storage system, comprising:
a plurality of individual energy storage devices positioned one over the next in a stacked configuration,
wherein at least one of the plurality of individual energy storage devices comprises:
a first graphite film;
a second graphite film; and
an electrode divider ring entirely disposed between the first graphite film and the second graphite film,
wherein the first graphite film, the second graphite film, and the electrode divider ring form a sealed enclosure, and
wherein at least a portion of a first edge of the electrode divider ring extends into the first graphite film and wherein at least a portion of a second opposing edge of the electrode divider ring extends into the second graphite film, such that the electrode divider ring is embedded into the first and second graphite films.

12. The energy storage system of claim 11, wherein the second graphite film of the at least one of the plurality of individual energy storage devices is adjacent a first graphite film of an adjacent individual energy storage device, and wherein the adjacent first graphite film and second graphite film are electrically coupled to couple the adjacent individual energy storage devices in electrical series.

13. The energy storage system of claim 12, wherein the adjacent first graphite film and second graphite film are in direct contact with one another.

14. The energy storage system of claim 11, further comprising a first electrically conductive component coupled to a top of the stack of plurality of individual energy storage devices at a first graphite film of a first individual energy storage device, and a second electrically conductive component coupled to the bottom of the stack of plurality of individual energy storage devices at a second graphite film of a last individual energy storage device.

15. The energy storage system of claim 11, wherein the at least one of the plurality of individual energy storage devices comprises an ultracapacitor.

16. The energy storage system of claim 11, wherein the at least one of the plurality of individual energy storage devices comprises a battery.

* * * * *